April 28, 1925.

D. MACDONALD

THERMIC TELLTALE

Filed Jan. 29, 1924

Donald Macdonald
INVENTOR;
By [signature]
his Attorney.

Patented Apr. 28, 1925.

1,535,536

UNITED STATES PATENT OFFICE.

DONALD MACDONALD, OF MELBOURNE, VICTORIA, AUSTRALIA.

THERMIC TELLTALE.

Application filed January 29, 1924. Serial No. 689,381.

*To all whom it may concern:*

Be it known that I, DONALD MACDONALD, a subject of the King of Great Britain and Ireland, residing at Stock Exchange House, 90 Queen Street, Melbourne, in the State of Victoria, Commonwealth of Australia, have invented certain new and useful Improvements in Thermic Telltales; and I do hereby declare the following to be a full, clear, and exact description of the invention, such as will enable others skilled in the art to which it appertains to make and use the same.

This invention relates to means for preserving an indication of a rise in temperature above a predetermined limit, even though the temperature afterwards falls again before the indicating means is inspected; and although this invention is particularly adapted to cases in which there is a low temperature limit, it is not confined thereto. Various forms of apparatus record attainments of some predetermined heat but such apparatus is usually costly and bulky, and their fields of application are therefore restricted.

Ordinary thermometers preserve no record of the attainment of any temperature after it has changed; some preserve a record of extreme temperature only; some employ a chart; and there are mechanisms which at a particular heat close an electrical circuit, open a valve, or so on. But, in these cases the simplicity and cheapness which characterize my construction are absent, all these old devices being unsuited for use in place of my invention.

Some goods have to be maintained at a temperature below a specific limit otherwise they deteriorate. Their temperature might be temporarily raised above the limit, causing damage, and then their temperature might be reduced, and a suitable tell tale it thus desirable, so that the fact that the rise of temperature occurred shall not escape easy notice.

In the case of ice cream, enclosed in edible material or any covering whereby the condition of the ice cream could not be perceived without breaking the enclosing material, my tell tale is very useful.

Ice cream products are frequently distributed to traders in boxes having heat insulating walls, or in containers having walls packed with a mixture of ice and salt, and these boxes or containers are often transported long distances at about zero temperature.

Nevertheless their lids or covers are eventually opened or removed, and this may be for such periods as to allow the ice cream to soften or melt. The lids or covers are in such cases often subsequently closed or replaced, and the temperature again becomes reduced, the ice cream becoming refrozen;—yet such ice cream will have become inferior and leathery or otherwise unpalatable, and in some cases will not be good food.

I embody by invention in a cheap, small, simple tell-tale which can be used in a domestic ice chest, in a container packed with ice and salt, in a packing case containing confectionery, in or on a bottle containing fluid, in or on a package as vended, and so on—often in circumstances in which it would not be convenient or practicable to apply any bulky or complicated temperature recording apparatus to the goods.

My tell tale produces and preserves a record of the rise of temperature above the limit predetermined, so that if the temperature falls below the limit, the tell tale will prove that the rise occurred.

The cost of a tell tale may be only a fraction of a penny, and in size it may be no larger than about the size of a shilling or even much smaller; and this enables a tell tale to be applied to each carton of ice cream, and to other packages in similar manner, without extravagance.

I refer to ice cream as an example because it is often covered by chocolate, wrapped in waxed paper, put in a carton, and then transported long distances or kept a considerable time prior to consumption. There are many enclosed articles besides cold edible foods as to which it is useful to know whether they have been overheated, and this invention is useful combined or associated with each wrapper, enevelope, or the like thereof or in suitable proximity thereto. By simply inspecting the tell tale the desired information is secured without opening the wrapper.

My tell tale contains an element which becomes changed by heat when the latter rises above that which is to be detected, and this element may be termed fugitive. Prior to that heat being reached this element is distinctly visible, and it will be used in some cases as a mask over another element, but once the heat change occurs, it ceases to remain as originally, and a subsequent fall of temperature will not restore it to its original appearance. I combine any suitable housing with the fugitive element, in some cases part of a carton, bag, tag, or other container.

For the detection of overheating of ice cream, the fugitive element I prefer is a small quantity of frozen opaque ice cream.

Embodiments of this invention may be as described hereinafter relatively to the accompanying drawings.

In the drawings herewith, Figure 1 shows a plan of one form of my tell tale enlarged from the size which in practice I often use, and with parts broken away to show the interior.

In these drawings $p$ is a package, and $t$ is a tag and $c$ is a chambered member or annulus, to contain—in a chamber or aperture $c^1$—an element, an example of which is material $a$ which covers or hides a backing which serves as an indicator, and is shown by member $b$. Member $c$ which thus houses the material $a$ in chamber $c^1$, is of metal, cardboard, wood, fibre or the like, being of absorbent material wholly or partly, as of blotting paper, absorbent cloth, asbestos or the like when desired. The backing $b$ is of absorbent material, preferably coloured so that it can be easily recognized, and blotting paper is suitable in many cases. In some cases a non-absorbent backing is usable.

Figure 4:
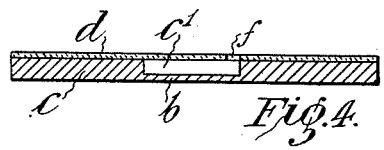
Figure 5:
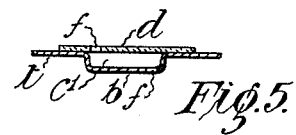
Figure 6:
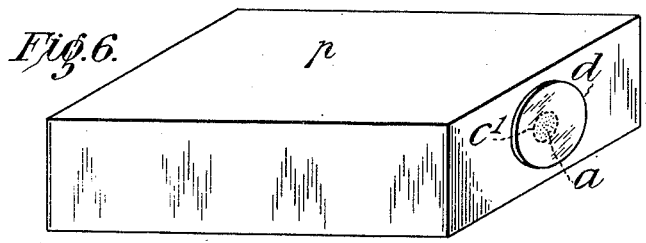
Figure 6 is a perspective view of a packet or carton equipped with a tell tale, the position of which may be varied to suit occasions.
Figure 7:
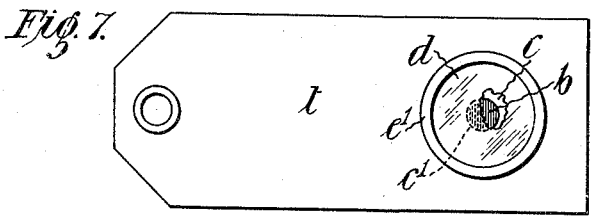
Figure 7 shows a tag carrying a tell tale.

I provide a transparent cover or window $d$ when desired also;—this may be a disc of gelatine, celluloid, glass or the like, over the fugitive element. Figures 4 and 5 each show a recessed body covered by a window member. In Figure 5 $t$ indicates part of any suitable article, for example a tag $t$. A binder is usable, and is shown by the member $e$ having flanged edges $e^1$ which hold cover $d$ on housing $c$ over indicator $b$; but the elements may be held assembled by adhesive, or otherwise conveniently.

Figure 1:
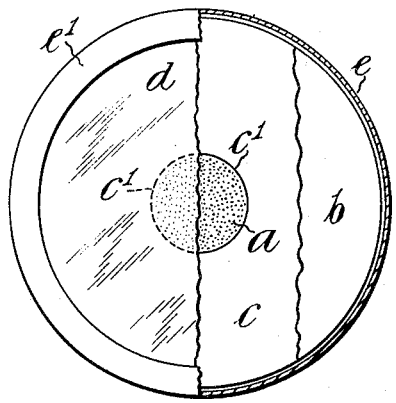
Figure 3:
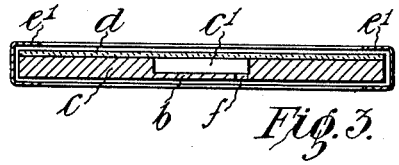
Figures 3, 4 and 5 show modifications of Figures 1 and 2, but the fugitive element is omitted from Figures 3 to 5.
Figure 2:
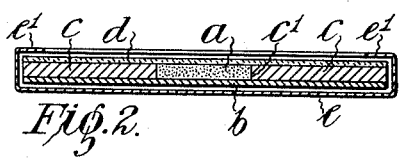
Figure 2 is an elevation in vertical section through the tell tale of Figure 1.

Parts $c$ and $b$ which are independent in Figure 2 are shown integral in Figures 3 and 4. When it is desired to allow of escape of the fugitive material from its chamber through one or more apertures I provide the same. Thus $f$ are holes or passage-ways.

I do not limit embodiments of my invention to the specific forms described, nor its use to ice cream products, as it can obviously be applied in connection with detection of the temperatures affecting explosives, confectionery, fruit, meat, eggs, milk, and other goods. The temperature at which indication occurs will depend on the fugitive material, the desired effect on different substances being obtainable at different temperatures. I use opaque or semi-opaque water, for example, as an element for detecting a rise of temperature to 32 degrees Fahrenheit. To detect attainment of a higher temperature such as about 80 degrees Fahrenheit I have used fatty substances, one being cocoa butter. Whatever the temperature to be detected, the detecting material will function as hereinbefore described.

In use, my tell tale is placed in a detecting position. So long as the temperature remains below that which is the artificial one the fugitive element will cover and hide the backing. If the local temperature rises to the critical temperature —, for example, to that which liquefies ice cream, the fugitive element softens, liquefies, and escapes from its chamber, being for example absorbed by the backing and/or the housing. In consequence the backing will become conspicuously visible to an observer. The fugitive member will not be restorable to its original location and condition.

I claim:—

1. A heat attainment tell tale containing absorbent matter, and material which combines with said absorbent matter when, but only when, a rise of temperature occurs to that which is to be detected.

2. A heat attainment tell tale containing a chamber with surfaces of absorbent material, and a fugitive element in the chamber whereby absorption of the said element by the absorbent material will occur when a rise of temperature occurs to that which is to be detected.

In witness whereof I have hereunto set my hand.

DONALD MACDONALD.